US008788240B2

(12) United States Patent
Pioro et al.

(10) Patent No.: US 8,788,240 B2
(45) Date of Patent: Jul. 22, 2014

(54) MONITORING METHOD OF VERTICAL DISPLACEMENT AND VERTICAL DEFLECTION CHANGE OF BUILDING CONSTRUCTION ELEMENTS, ESPECIALLY OF THE ROOF, AND A SYSTEM FOR REALIZATION OF THIS METHOD

(75) Inventors: Zbigniew Pioro, Warsaw (PL); Jakub Jasinski, Andrespol (PL); Marcin Osiniak, Warsaw (PL); Stanislaw Wierzbicki, Warsaw (PL)

(73) Assignee: WISEN sp. zo. o., Warsaw (PL)

( * ) Notice: Subject to any disclaimer, the term of this patent is extended or adjusted under 35 U.S.C. 154(b) by 372 days.

(21) Appl. No.: 13/205,068

(22) Filed: Aug. 8, 2011

(65) Prior Publication Data

US 2012/0166136 A1     Jun. 28, 2012

(30) Foreign Application Priority Data

Dec. 22, 2010  (PL) .......................................... 393402

(51) Int. Cl.
*G01C 9/00* (2006.01)
*G01B 11/16* (2006.01)
(52) U.S. Cl.
CPC ..................................... *G01B 11/16* (2013.01)
USPC ........................................................ 702/150
(58) Field of Classification Search
USPC ............................................................ 702/150
See application file for complete search history.

(56) References Cited

U.S. PATENT DOCUMENTS

| 4,901,575 | A | * | 2/1990 | Bohannan et al. ............... 73/587 |
| 5,245,181 | A | * | 9/1993 | Cho ............................... 250/236 |
| 5,404,132 | A | * | 4/1995 | Canty et al. ................. 340/686.2 |
| 5,850,185 | A | * | 12/1998 | Canty .......................... 340/686.1 |
| 6,480,270 | B1 | * | 11/2002 | Studnicka et al. .......... 356/141.1 |
| 7,023,537 | B2 | * | 4/2006 | Labat et al. ............... 356/139.04 |
| 2004/0114152 | A1 | * | 6/2004 | Hill et al. ....................... 356/498 |
| 2007/0035841 | A1 | * | 2/2007 | Kinney et al. ................. 359/592 |
| 2007/0163321 | A1 | * | 7/2007 | Brown ............................ 72/163 |
| 2007/0164874 | A1 | * | 7/2007 | Visser .......................... 340/686.1 |
| 2008/0016790 | A1 | * | 1/2008 | Weber ........................... 52/90.1 |
| 2008/0030710 | A1 | * | 2/2008 | Oshima ....................... 356/4.01 |
| 2008/0284849 | A1 | * | 11/2008 | Kassem ........................ 348/143 |
| 2009/0123059 | A1 | * | 5/2009 | Gunji et al. ................... 382/147 |
| 2009/0183567 | A1 | * | 7/2009 | Fukushima et al. ....... 73/504.02 |
| 2009/0267895 | A1 | * | 10/2009 | Bunch .......................... 345/157 |
| 2010/0119336 | A1 | * | 5/2010 | Echauri Senosiain .......... 414/10 |
| 2012/0140247 | A1 | * | 6/2012 | Monestere .................... 356/620 |

FOREIGN PATENT DOCUMENTS

| DE | 10 2006 045 263 | 3/2008 |
| JP | 8-93230 | 4/1996 |
| PL | 183116 | 5/1997 |
| PL | 381578 | 1/2007 |
| WO | 03/019113 | 3/2003 |

* cited by examiner

*Primary Examiner* — Jonathan C Teixeira Moffat
*Assistant Examiner* — Alvaro Fortich
(74) *Attorney, Agent, or Firm* — Katten Muchin Rosenman LLP

(57) ABSTRACT

The invention relates to a monitoring method of vertical displacement of selected points of building construction elements, especially roof construction elements or their parts, and vertical deflection change in these points, wherein a distance, preferably vertical, between each of monitored points of construction elements and the stable elements or stable floor is measured, and then a value of vertical displacement of each monitored point, which occurred from the moment of monitoring initiation, is calculated, and then for each monitored construction element the value of vertical deflection change in the monitored point is calculated. The invention relates also to a system for monitoring of vertical displacement of monitored points as well as vertical deflection change in these points of building construction elements.

15 Claims, 3 Drawing Sheets

MONITORING METHOD OF VERTICAL DISPLACEMENT AND VERTICAL DEFLECTION CHANGE OF BUILDING CONSTRUCTION ELEMENTS, ESPECIALLY OF THE ROOF, AND A SYSTEM FOR REALIZATION OF THIS METHOD

The object of this invention is a monitoring method of vertical displacement of building construction elements, especially of the roof, and vertical deflection change of these elements as well as the realization of this method. This method can be used in systems for monitoring of deflection of the roof construction elements, especially in large area buildings. The system can function well in a multipoint solutions and ensures "mapping" of many construction elements of the building, especially of the roof.

BACKGROUND OF THE INVENTION

Due to the safety reasons it is necessary to monitor many physical quantities in buildings including vertical displacement of building construction elements, especially the roof construction elements or their parts. It can be realized, among other methods, by determining the difference between current value of distance of these elements from stable construction elements or stable floor and its initial value, which was determined during monitoring initiation, measured by laser rangefinder fastened directly to these elements by means of different kind of suspensions. It is also necessary to monitor a stress in construction elements as a value, which is directly connected with a threat of construction safety. One of the methods of monitoring stress is to monitor element deflection as a value, which is clearly and unambiguously connected with stress (by strain-stress relation) but is much easier to measure.

There are known systems for monitoring changes in the location of building construction elements, in which optical devices are used.

In Polish application description P-381578 a method was described, in which light beam is directed below elements of roof structure. Deflection of at least one construction element equipped with a special diaphragm above the allowable, assumed value results in interruption of light beam and activation of both sound and visual alarms. The device consists of a transmitter and receiver of light beam installed under the roof at opposite ends of a monitored building. Diaphragms, installed on construction elements, are positioned in a straight line above the light beam. Receiver is connected to alarming devices.

In patent description PL 183116 a measuring method of beam torsion and deflection in static and dynamic systems was presented. The method consists in mounting of at least one mirror on a monitored element, on which laser beam is directed, whose reflected light is read on the screen and change of beam stress results in a proportional displacement of reflected laser spot on the screen; in static measurements we get a displacement of light spot and in dynamic measurements—displacement of light line.

Description DE102006045263 reveals a device for measuring of construction deformations, especially construction of the roof, including an optical device emitting signal, e.g. laser, and a device for receiving light signals. The system includes one alarm unit. Measuring devices are fastened on the edges of the building sidewalls and they make measurements of the distance on a straight line between two building walls just below construction elements of the roof.

International application description WO03019113 presents a system, which provides security in buildings, which consists of optical devices emitting light signal and receiving them by means of mirrors. Construction deformation, which causes breaking of a light beam activates an alarm signal.

Description JP 8093230 presents a monitoring method of deformation of roof construction with a system of many laser rangefinders. The system is coupled with a warning system. Laser rangefinders measure distances between construction elements, e.g. elements of the roof.

The main limitation of the above mentioned solutions is the fact, that they are rather detection systems, that means systems, which detect achieving a certain state (value), and not monitoring systems, which can measure continuous changes of a certain quantity, process and archive the collected measuring data. Moreover, in these systems the value, which causes alarm activation, is poorly defined—as an widely understood displacement of elements, which does not have to be an unambiguous measure of stress and thus a threat of construction safety. The additional limitation of these systems can be its insufficient resistance on certain disturbing phenomena, e.g. torsion of elements, to which a mirrors or diaphragms are attached.

SUMMARY OF THE INVENTION

The objective of this invention is to develop a method of monitoring the vertical displacement and the deflection change of building construction elements, such as roof, especially in large area buildings. This method can be used for automatic and reliable determining a threat of building structure safety caused by temporary, external factors, mainly snowfall, in order to manage rationally a process of snow removal and to signal the possibility of a construction disaster in result of roof collapse.

A threat of building structure safety caused by temporary, external factors is determined on the basis of the value of vertical deflection change of construction elements being representative for response of given building, especially of the roof, on temporary, external loading.

The object of this invention is a monitoring method of vertical displacement of selected Monitored Points of building construction elements, especially roof construction elements or their parts, and vertical deflection change in these Points, wherein a distance, preferably vertical, between each of Monitored Points of construction elements and the stable construction elements or stable floor is measured, and then a value of vertical displacement of each Monitored Point, which occurred from the moment of monitoring initiation, is calculated by subtracting the measured distance from its initial value determined during monitoring initiation, and then for each monitored construction element the value of vertical deflection change in the Monitored Point, that occurred from the moment of monitoring initiation, is calculated by subtracting the calculated value of vertical displacement of each other Monitored Points multiplied by a coefficient, whose value represents a part of vertical displacement of this Point, which is transferred to Monitored Point, in which the value of vertical deflection change is calculated, from the calculated value of vertical displacement of this Point.

It is beneficial if a distance, preferably vertical, is also measured for each of the selected Control Points, in which there will be no vertical deflection change of construction elements, but there will be vertical displacement caused by stacking of the structure or setting of the foundations, from the stable construction elements or stable floor, and then the value of vertical displacement of each Control Point, which occurred from the moment of initiation of monitoring, is calculated by subtracting the measured distance from its initial value determined during monitoring initiation, and then for every Monitoring Point a corrected value of vertical displacement is calculated by subtracting the value of the vertical displacement of every Control Point multiplied by a coefficient, whose value represents a part of vertical displacement of this Control Point, which is transferred to the Monitored Point, from the determined value of vertical displacement of this Point, then values of vertical deflection change in Monitored Points are determined from corrected values of vertical displacement of Monitored Points.

It is also beneficial if the distance is measured by rangefinders, preferably laser type, which are fastened to building construction elements in Monitored Points, preferably by means of swinging, inextensible suspensions, preferably having little static and large dynamic dissipation factors.

It is beneficial if the result of distance measurement made by a rangefinder is deemed as incorrect or measurement is not made in the case, when the results of angular rate measurements made by multi-axial sensor, preferably dual axis, preferably angular rate gyroscope, with which a rangefinder is equipped, indicate swinging of rangefinder, which has caused or can cause distance measurement error greater than the assumed, allowable value.

It is beneficial if measurements made by multi-axial, angular rate sensor and measurement of distance made by a rangefinder is repeated automatically after a short period of time, preferably 10 to 60 seconds, in the case of detecting of rangefinder swinging, which can cause measurement error greater than the assumed, allowable value, and excessive swinging of rangefinder is signaled as an incident, which requires supervisory intervention in the case, when it is permanent, which means that it will be detected during several consecutive measurements, preferably at least four.

It is beneficial if the result of distance measurement made by a rangefinder is deemed as incorrect or measurement is not made in the case, when the results of measurements made by multi-axial inclinometer, preferably dual axis, preferably static accelerometer, with which a rangefinder is equipped, indicate a change of static deviation angle of the rangefinder laser beam from its initial equilibrium direction, which can cause a measurement error greater than the assumed, allowable value.

It is also beneficial if measurements made by multi-axial inclinometer and measurement of distance made by rangefinder are repeated automatically after a short period of time, preferably 10 to 60 seconds, in the case of detecting of a change of static deviation angle of the rangefinder laser beam from its initial equilibrium direction, which can cause a distance measurement error, which is greater than the assumed, allowable value, and a change of static deviation angle of the rangefinder laser beam from the vertical is signaled as an incident, which requires supervisory intervention in the case, when it is permanent, which means that it will be detected during several consecutive measurements, preferably at least four.

It is beneficial if in the case, when the result of distance measurement made by a rangefinder differs by more than the assumed, allowable value from the latest correct result of distance measurement, the measurement is repeated automatically after a short period of time, preferably 2 to 20 seconds; and if the result of distance measurement made by a rangefinder still differs by more than the assumed, allowable value from the latest correct result of distance measurement, the measurement is once more repeated after a short period of time, preferably 2 to 20 minutes.

It is beneficial if rangefinders make measurements periodically, preferably every 3 to 6 hours, while between measurements they stay in energy saving state, and if in any of Monitored Points the recorded value of vertical deflection change is greater than the determined threshold value then the time interval between measurements is decreased, preferably twice, and it is decreased further with increasing of measured values of vertical deflection change, preferably twice, at exceeding next threshold values or increased with decreasing of measured values of vertical deflection change.

The object of this invention is also a system for monitoring of vertical displacement of Monitored Points on building construction elements as well as vertical deflection change in these Points, especially roof construction elements or their parts, comprising, in selected Monitored Points (MP) and Control Points (CP) of roof construction elements, Rangefinders (R), preferably laser type, connected by a link, preferably wireless, ensuring two-way data transmission with Central Device (CD) including the following functional blocks connected sequentially:

a) Distance Measuring Block (DMB), which collects measurement results from all Monitored Points (MP) and (CP), including measurement of distance, preferably vertical, of each of these Points of construction elements from stable construction element or stable floor and preprocessing these data, b) Vertical Displacement Block (VDB), which calculates the values of vertical displacement of Monitored Points (MP) and Control Points (CP), c) Validation Block (VB), which verifies values of vertical displacement of Monitored Points (MP) and Control Points (CP) received from Vertical Displacement Block (VDB), d) Building Model Block (BMB), which calculates the values of vertical deflection change of construction elements in Monitored Points (MP), e) Building Condition Diagnosis Block (BCDB), which includes Limitation Block (LB) using the allowable values and threshold values of deflection change and vertical displacement, determined during setting the parameters of the system, connected with Knowledge Base Block (KBB), which defines a threat of building structure safety using data received from Building Model Block (BMB) and Limitation Block (LB), and Building Condition Diagnosis Block (BCDB) is connected to Signaling Block (SB).

It is beneficial when the system includes a Programming Block (PB) connected to Distance Measuring Block (DMB), Vertical Displacement Block (VDB), Validation Block (VB), Building Model Block (BMB), Limitation Block (LB), Knowledge Base Block (KBB) and Signaling Block (SB), where the connection between Programming Block (PB) and Signaling Block (SB) is two-way.

It is beneficial when Rangefinders (R), located in Monitored Points (MP) and Control Points (CP), are connected to Central Device (CD) directly and/or in cascade and/or by Retransmitting Devices (RD).

It is beneficial when each of Rangefinders (R), placed in Monitored Points (MP) and Control Points (CP), is connected directly to Access Device (AD) of star topology network; each of such networks includes one Access Device (AD) and at least one Rangefinder (R), while Access Devices (AD) are connected to Central Device (CD) directly and/or in cascade and/or by Retransmitting Devices (RD).

It is beneficial when Rangefinders (R) are equipped additionally with multi-axial angular rate gyroscope, preferably two axis, and/or multi-axial, static accelerometer, preferably two axis, and/or temperature sensor; the results of all measurements made by these rangefinders are transmitted to Central Device (CD).

It is beneficial when the results of additional measurements made by multi-axial angular rate gyroscope and/or multi-axial, static accelerometer and/or temperature sensor received from Rangefinders (R) by Central Device (CD) are processed in Diagnostics Block (DB) connected to Programming Block (PB) and Distance Measuring Block (DMB).

In the method being the object of this invention, it is beneficial if the measurement of distance is made simultaneously with the measurement of ambient temperature of the Monitored Points and Control Points and if the measurements are made periodically, preferably automatically. During the initiation of monitoring an initial value of vertical deflection is determined in each Monitored Point and then after determination of the value of vertical deflection change in each Monitored Point, the value of total vertical deflection is calculated by adding the determined value of vertical deflection change and its initial value in this Point.

It is also beneficial if ambient temperature of Monitored Points and Control Points is measured by means of temperature sensor, with which rangefinders are equipped.

It is beneficial if, in the method being the object of this invention, rangefinder swinging is signaled as an incident, which requires supervisory intervention in the case, when it is permanent, that is if it is recorded during several consecutive measurements, preferably at least four.

It is beneficial if a threat of building structure safety by external factors is determined by comparison of the determined values of vertical deflection change for each Monitored Point with defined for this Point threshold values of vertical deflection change determining the state of threat; a threat is graduated and the highest value of all degrees determined for all Monitored Points is assumed as current threat of building structure safety.

It is also beneficial if the determined values of vertical deflection change for each Monitored Point are compared with defined for this Point threshold values of vertical deflection change defining a threat and calculated values of vertical displacement for each Control Point are compared with determined for this Point threshold values of vertical displacement determining the level of a threat; a threat is graded and the highest value of all levels determined for all Monitored and Control Points is accepted as current threat of building structure safety.

It is beneficial when the determined values of vertical deflection change in the Monitored Points and the values of vertical displacement in Control Points as well as simultaneously measured values of ambient temperature of Monitored and Control Points are stored.

It is beneficial when, on the basis of measured values of ambient temperature of Monitored and Control Points and stored values of vertical deflection change in Monitored Points as well as stored values of vertical displacement of Monitored Points and the value of ambient temperature of Monitored and Control Points, which occurred earlier, it can be determined what part of the determined values of vertical deflection change in Monitored Points originate from a change of ambient temperature of these Points.

The method being the object of this invention eliminates the above mentioned limitations of known methods of building monitoring. Firstly, this is the method of monitoring realization, that is continuous measurement of deflection change of many representative elements of building construction, which processes the results of measurements to ensure reliable and multistage information about a threat of building structure safety. Secondly, the method is based on the reliably determined changes in deflection of construction elements that is on the value, which is an objective stress index and thus a threat of the monitored building construction safety. Thirdly, the method is resistant to a number of disturbing phenomena giving reliable and validated information.

High reliability of determining of construction elements deflection on the basis of the results of the measurement of vertical displacement of these elements results from the fact, that during determining of deflection change it is taken into consideration that vertical displacement can have three components: the first—deflection of the element itself, the second—connected with the settlement of supports (foundations) of the building and the third—connected with the displacement of elements supporting the element, whose deflection is determined.

Settlement of supports (foundation) of a building is taken into consideration by introducing special Control Points, in which vertical deflection change of construction elements are not to be found, but there will be vertical displacement caused by settlement of construction or building supports and correcting, using measured results of displacement in these Points, vertical displacement of Monitored Points, in which deflection change is determined.

The method of this invention is insensitive to a number of measurement disturbances. The first disturbance taken into consideration in the method of this invention is temporary movement (swaying) of measuring device (Rangefinder) swingingly fastened to monitored construction element caused for example by a gust of wind. This disturbance is eliminated in such a way that the result of distance measurement is deemed to be correct only when maximal error of distance measurement, which could occur in result of swinging movement of rangefinder during measurement, calculated on the basis of the results of measurements by means of angular rate gyroscope, with which rangefinder is equipped, of two mutually orthogonal components of rangefinder angular rate, preferably perpendicular to the direction of rangefinder laser beam, is lower than the assumed value.

The second disturbance taken into consideration in the method of this invention is permanent change of deflection of rangefinder laser beam from its initial equilibrium direction caused for example by permanent mechanical obstacle. This disturbance is eliminated in such a way that the result of distance measurement is deemed to be correct only when maximal error of distance measurement due to static change of the position in space of rangefinder laser beam, determined on the basis of a change of measurement results of two mutually orthogonal components of acceleration due to gravity, preferably perpendicular to the direction of rangefinder laser beam, made by an inclinometer, preferably by static accelerator, with which rangefinder is equipped, is lower than the assumed value.

The next possible disturbance, taken into consideration in the method of this invention, is incorrect rangefinder reading caused by an obstacle appearing in the laser measurement axis e.g. passing man, left equipment, vehicle etc.

The method of this invention makes it possible to make monitoring systems determining a threat level of building structure safety. The method also allows monitoring of the overall condition of the building, e.g. connected with its settling, so there will be detected changes of construction elements positions caused by any factors and thus in every case a threat will be detected.

BRIEF DESCRIPTION OF THE DRAWINGS

The method of this invention realized as a monitoring system is explained on the basis of an example in the drawing, where.

DESCRIPTION OF A PREFERRED EMBODIMENT

Figure 1:
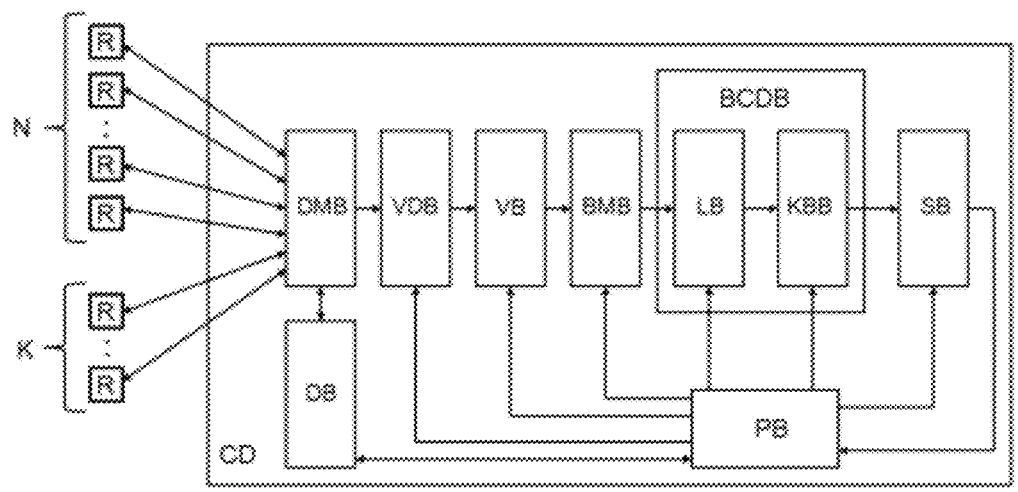
FIG. 1 shows a block diagram of the system.
Figure 2:
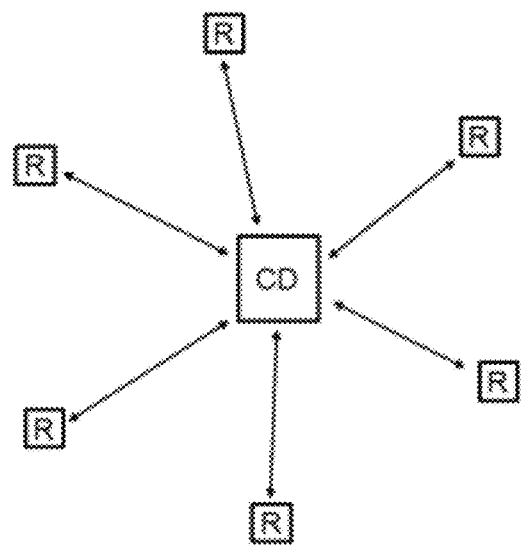
FIGS. 2-4 show possible methods of connecting Rangefinders (R) and a Central Device (CD) in the system and FIG. 5 shows an alternative architecture of the system network.
Figure 3:
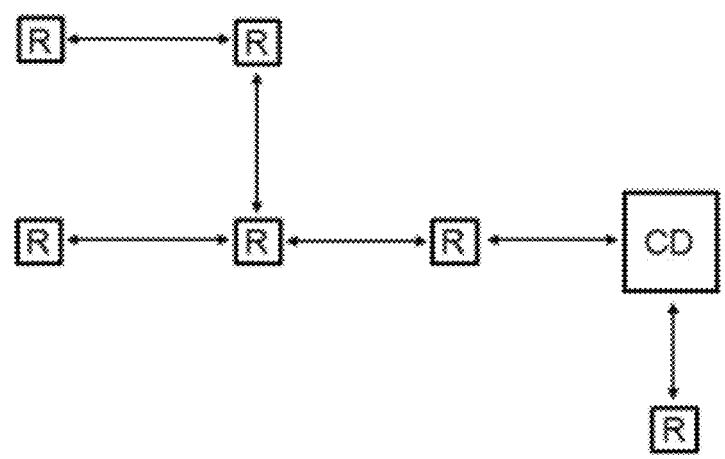
Figure 4:
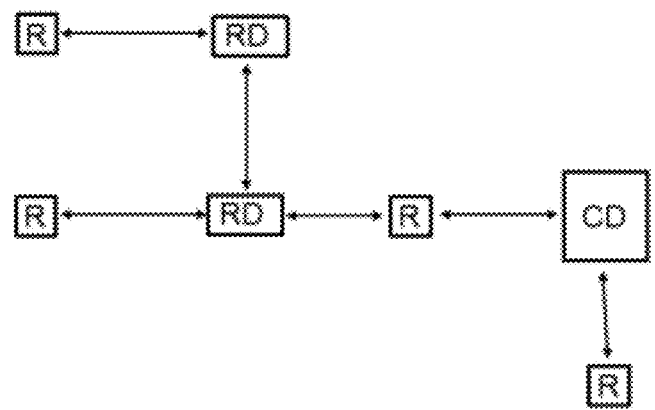
Figure 5:
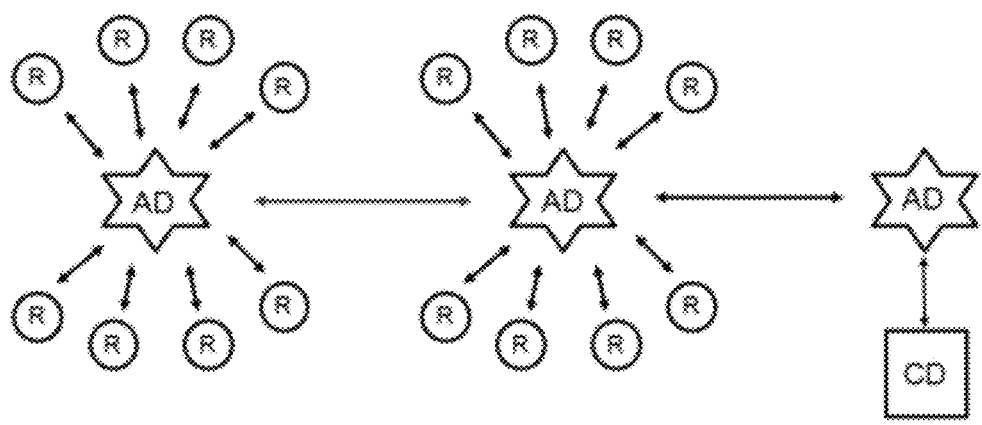

The method in exemplary embodiment can be used in a system, which can consist of N Rangefinders (R), which measure N distances between Monitored Points (MP) and stable floor and optionally K Rangefinders (R), which measure K distances between Control Points (CP) and stable floor and Central Device (CD). These devices are connected to form a network, preferably wireless, enabling two-way communication between Central Device (CD) and each Rangefinder (R). Connections between Rangefinders (R) and Central Device (CD) can be realized directly (FIG. 2) or indirectly and/or in cascade (FIG. 3) or directly and/or in cascade and/or by Retransmitting Devices (RD) (FIG. 4). In other embodiment of the system Rangefinders (R) can be connected directly with Access Devices (AD) into one or more star topology networks; each star topology network includes one Access Device (AD) and at least one Rangefinder (R), while Access Devices (AD) are connected with Central Device (CD) directly and/or in cascade and/or by retransmitting devices. FIG. 5 shows an example of such embodiment of a system with Access Devices (AD) connected in cascade to the Central Device (CD).

It is beneficial when Central Device (CD) controls the operation of Rangefinders (R), especially defines time intervals between consecutive distance measurements made by Rangefinders (R).

The system is controlled by Central Device (CD) and its operation is determined by following connected in series functional blocks: a) Distance Measurement Block (DMB), b) Vertical Displacement Block (VDB), c) Validation Block (VB), d) Building Model Block (BMB), e) Building Condition Diagnosis Block (BCDB) consisting of Limitation Block (LB) and Knowledge Base Block (KBB) and f) Signaling Block (SB).

Distance Measurement Block (DMB) collects results of distance measurements of N Monitored Points (MP) and K Control Points (CP) from stable floor made by Rangefinders (R), which are measured periodically. It also collects measurement results of: ambient temperature, supply voltage, deflection angle of optical measuring axis from the vertical, amplitude of device swaying in a suspension and general status of laser rangefinder, sent periodically by rangefinders.

Condition of monitored building is evaluated in a system using changes of measured distances, that is values of vertical displacement, which are currently calculated for all Monitored Points (MP) and all Control Points (CP) in Vertical Displacement Block (VDB) based on the results of distance measurements received periodically from Distance Measurement Block (DMB). The calculation of vertical displacement value for each Point is realized by subtraction of currently measured value of distance from the floor from value of this distance measured during the system initiation.

Validation Block (VB) is used for the elimination of disturbed (incorrect) results of distance measurement, which can occur during operation of the system. The calculated values of vertical displacement for Monitored Points (MP) and Control Points (CP) can include components coming not only from actual displacement of construction elements but also components coming from disturbances, which can be temporary, e.g. a man walking under Monitored Point (MP) or Control Point (CP) during making measurement, or permanent, e.g. rearranging the building layout. Although generally the places on the ground, which are measurement reference points, will be duly marked, it cannot be excluded that such disturbances can occur.

Validation block eliminates temporary disturbances in such a way that, if the result of current measurement differs considerably, e.g. by more than 30 cm, from the result of previous measurement, it is ignored and next measurement is made after a short period of time, e.g. 3-6 seconds. If the measurement result is still considerably different than the result of previous valid measurement, the measurement will be repeated once again after a bit longer time, e.g. after 15 minutes. This measurement results will be normally processed by the system—if after this time the situation does not return to normal, i.e. the measurement result will considerably differ from the previous valid measurement result, processing of such result will probably activate the alarms.

The task of Building Model Block (BMB) is to determine the value of the deflection change of monitored construction elements in Monitored Points (MP) on the basis of calculated and validated values of vertical displacement of Monitored and Control Points and parameters, whose values are strictly connected with the given building and its construction. The parameters will be determined individually for each building and will be entered into the system during its initiation.

Measured values of vertical displacement of construction elements are not equal to the values of deflection change of these elements due to at least two reasons. Firstly, the measured value of displacement of elements is affected by settlement of building supports (foundations), which are connected structurally with the elements, whose displacement are measured. Secondly, displacement of a given element and thus a Monitored Point (MP) located on it can result from the deflection of primary element (or elements), on which given element of a secondary structure is supported.

The first effect is modeled in a building model by correction of calculated of vertical displacement values of building elements in Monitored Points by a value resulting from support settlement. For the realization of this correction there will be used measured values of vertical displacement of Control Points located in points, where there will be no deflection of roof construction elements under the influence of additional temporary load, but there will be settlement of supports (foundation) representative for the whole building or its large part.

The second effect is modeled in a building model by correction of calculated vertical displacement values in a given Monitored Point (MP) by results of vertical displacement in other Monitored Points (MP) of the system multiplied by coefficients representing "mechanical coupling" of construction elements. Appropriate Monitored Points, which should be taken into consideration here and their coefficients are also determined according to building architectonic data.

At the output of Building Model Block (BMO) current values of deflection change of monitored construction elements in Monitored Points are founded.

Diagnosis Block (DB) realizes evaluation and decision-making process using Knowledge Base in a form of a set of inference rules. Diagnosis Block (DB) contains Limitation Block (LB) and Knowledge Base Block (KBB).

Limitation Block (LB) is used for determining normalized values of auxiliary variables, which simplify the making of the knowledge base. For this purpose the allowable values of deflection for each Monitored Point (MP) and vertical displacement for each Control Point (CP) entered during setting the system parameters are used.

Knowledge base is a set of facts defined by means of input variables, which values are calculated in Limitation Block (LB), and threshold values set for these variables and a set of inference rules applying to these facts. Knowledge base allows the evaluation of a threat of the monitored building safety.

It is beneficial when Knowledge Base Block (KBB) contains memory, in which all results of measurements and calculations made by the system from moment of monitoring initiation are stored.

Signaling Block (SB) tracks all transitions between the possible states of a monitoring system, controlled by appropriate values of Knowledge Base Block (KBB) output variables. In a given state Signaling Block (SB) executes all tasks, which in a given state should be done, e.g. generating proper information for users. It is beneficial when Signaling Block (SB) includes the technical means for signaling and notification, preferably many types, signaling a threat of building construction safety and notifying about threat of building construction safety and incidents, which require supervisory intervention.

In Diagnostics Block (DB) operation of the system is evaluated on the basis of received from Distance Measurement Block (DMB) current results of measurements realized by Rangefinders (R): ambient temperature, supply voltage, deflection angle of optical measuring axis from the vertical axis, amplitude of device swaying in a suspension as well as a general status of Rangefinder.

The system according to the invention is equipped with Programming Block (PB) connected to Diagnostics Block (DB), Vertical Displacement Block (VDB), Validation Block (VB), Building Model Block (BMB), Limitation Block (LB), Knowledge Base Block (KBB) and Signaling Block (SB). Programming Block (PB) is responsible for programming and controlling operation of all blocks, to which it is connected. Programming Block (PB) receives information about the condition of the building from Signaling Block (SB) and information about the condition of the monitoring system from Diagnostics Block (DB).

The threat of monitored building construction safety in a system according to the invention is graduated. The range of allowable deflection change in Monitored Points is divided into several programmable intervals, e.g. 0-30%, 30%-50%, 50%-70%, 70%-95% and >95% of allowable value defined for each Point during system initiation. Each exceeding of the boundary between these intervals is signaled by the system. Thus the system signalizes many states of threat, from the state of increased readiness of the system, e.g. in a range of 30%-50%, through a need of snow removal, e.g. in a range of 70%-95%, to the need of immediate building evacuation, e.g. in a range>95%.

Example of embodiment does not limit the invention.

What is claimed is:

1. A method for monitoring vertical displacements of a plurality of Points on building construction elements and vertical deflection changes in the Points, said method comprising:
    measuring, by each of a plurality of Rangefinders, a monitor distance for each of selected Monitored Points, on the building construction elements, from stable construction elements or a stable floor;
    calculating, by a Central Device, a value of vertical displacement of each Monitored Point, by subtracting the measured monitor distance from an initial value determined during a monitoring initiation; and
    calculating, for each monitored construction element, a value of vertical deflection change in a corresponding one of the Monitored Points, that occurred from the monitoring initiation, by subtracting the calculated value of vertical displacement of each other Monitored Point multiplied by a coefficient, whose value represents a part of vertical displacement of the one Monitored Point from the calculated value of vertical displacement of the one Monitored Point.

2. A monitoring method according to claim 1, further comprising:
    measuring a control distance for each of selected Control Points, at which there will only be vertical displacement and no vertical deflection changes of construction elements, from the stable construction elements or a stable floor;
    calculating a value of the vertical displacement of each Control Point, which occurred from the monitoring initiation by subtracting the measured control distance from an initial value determined during the monitoring initiation;
    calculating a corrected value of vertical displacement for each Monitored Point by subtracting the value of the vertical displacement of each Control Point multiplied by a coefficient, whose value represents a part of vertical displacement of the corresponding Control Point, which is transferred to the each Monitored Point, from the determined value of vertical displacement of the Monitored Point; and
    determining values of vertical deflection change in the Monitored Points from the corrected values of vertical displacement of the Monitored Points.

3. A monitoring method according to claim 1, wherein the rangefinders, are fastened the building construction elements at the Monitored Points by means of swinging, inextensible suspensions, and having little static and large dynamic dissipation factors.

4. A monitoring method according to claim 3, wherein a result of the monitor distance measurement made by one of the rangefinders is deemed as incorrect, when results of angular rate measurements made by a multi-axial angular rate sensor with which the one rangefinder is equipped, indicates swinging of the one rangefinder, causing a distance measurement error greater than an assumed allowable value.

5. A monitoring method according to claim 4, wherein the measurements made by the multi-axial angular rate sensor and the measurement of the monitor distance made by the one rangefinder are repeated automatically after a short period of time in the case of detecting of rangefinder swinging, which can cause measurement error greater than the assumed allowable value, and excessive swinging of a rangefinder is signaled as an incident, which indicates that supervisory intervention is required, when the excessive swinging is detected during plural consecutive measurements.

6. A monitoring method according to claim 3, wherein a result of the monitor distance measurement made by one of the rangefinders is deemed as incorrect, when results of measurements made by a multi-axial inclinometer, with which the one rangefinder is equipped, indicates a change of static deviation angle of the one rangefinder from an initial equilibrium direction, causing a distance measurement error greater than an assumed allowable value.

7. A monitoring method according to claim 6, wherein the measurements made by the multi-axial inclinometer and the measurement of the monitor distance made by the one rangefinder are repeated automatically after a short period of time; in the case of detecting of the change of static deviation angle, which can cause a distance measurement error greater than the assumed allowable value, and the change of static deviation angle is signaled as an incident, which indicates that supervisory intervention is required, when the change of static deviation angle is detected during plural consecutive measurements.

8. A monitoring method according to claim 3, wherein when a result of the monitor distance measurement made by one of the rangefinders differs by more than an assumed allowable value from a latest correct result of the monitor distance measurement, the monitor distance measurement is repeated automatically after a short period of time; and when the result of the monitor distance measurement made by the one rangefinder still differs by more than the assumed allowable value from the latest correct result of the monitor distance measurement, the monitor distance measurement is once more repeated after a short period of time.

9. A monitoring method according to claim 3, wherein the rangefinders make measurements periodically, and stay in an energy saving state between measurements, and if in any of the Monitored Points a recorded value of vertical deflection change is greater than a determined threshold value then a time interval between measurements is decreased the time interval is decreased further with increasing of measured values of vertical deflection change in exceeding a next threshold value, and the time interval is increased with decreasing of measured values of vertical deflection change.

10. A system for monitoring of vertical displacement of a plurality of Points on building construction elements as well as vertical deflection change in the Points, the system comprising:
   a plurality of Rangefinders (R) configured to measure distances at selected Monitored Points (MP) and Control Points (CP) of the building construction elements coupled to a Central Device (CD); and
   said Central Device comprising:
   a) Distance Measuring Block (DMB), which collects measurement results from all Monitored Points (MP) and Control Points (CP), including measurements of distances from stable construction elements or a stable floor,
   b) Vertical Displacement Block (VDB), which calculates values of vertical displacement of the Monitored Points (MP) and the Control Points (CP), the value of vertical displacement of each Monitored Point being calculated by subtracting a measured monitor distance of the each Monitored Point from an initial value determined during a monitoring initiation, and the value of vertical displacement of each Control Point being calculated by subtracting a measured control distance of the each Control Point from an initial value determined during the monitoring initiation,
   c) Validation Block (VB), which verifies values of vertical displacement of the Monitored Points (MP) and the Control Points (CP) received from the Vertical Displacement Block (VDB),
   d) Building Model Block (BMB), which calculates corrected values of vertical displacement of the Monitored Points (MP) and values of vertical deflection change of construction elements in the Monitored Points (MP), the corrected value of vertical displacement of the Monitored Points being calculated by subtracting the value of the vertical displacement of each Control Point multiplied by a coefficient, whose value represents a part of vertical displacement of the corresponding Control Point, which is transferred to the Monitored Points, from the determined value of vertical displacement of the Monitored Points, and the value of vertical deflection change for each monitored construction element in a corresponding one of the Monitored Points, which occurred from the monitoring initiation, being calculated by subtracting the corrected value of vertical displacement of each other Monitored Point multiplied by a coefficient, whose value represents a part of vertical displacement of the one Monitored Point, from the corrected value of vertical displacement of the one Monitored Point,
   e) Building Condition Diagnosis Block (BCDB), which includes a Limitation Block (LB) using allowable values and threshold values of deflection change and vertical displacement, determined during setting of parameters of the system, coupled to a Knowledge Base Block (KBB), which defines a threat of building structure safety using data received from the Building Model Block (BMB) and the Limitation Block (LB), and the Building Condition Diagnosis Block (BCDB) is coupled to a Signaling Block (SB).

11. A system according to claim 10 comprising a Programming Block (PB) coupled to the Distance Measuring Block (DMB), Vertical Displacement Block (VDB), Validation Block (VB), Building Model Block (BMB), Limitation Block (LB), Knowledge Base Block (KBB) and Signaling Block (SB), where a connection between the Programming Block (PB) and the Signaling Block (SB) is two-way.

12. A system according to claim 10, wherein the Rangefinders (R), placed in the Monitored Points (MP) and the Control Points (CP), are coupled to the Central Device (CD) directly and/or in cascade and/or by Retransmitting Devices (RD).

13. A system according to claim 10, wherein each Rangefinder (R), placed in the Monitored Points (MP) and the Control Points (CP), is coupled directly to an Access Device (AD) of a star topology network; each network including one Access Device (AD) and at least one Rangefinder (R), while the Access Devices (AD) are coupled to the Central Device (CD) directly and/or in cascade and/or by Retransmitting Devices (RD).

14. A system according to claim 10, wherein each of the Rangefinders (R) is equipped additionally with one or more of a multi-axial angular rate sensor, multi-axial inclinometer and temperature sensor; results of all measurements made by the rangefinders being transmitted to the Central Device (CD).

15. A system according to claim 14, wherein results of additional measurements made by the sensors received from the Rangefinders (R) by the Central Device (CD) are processed in a Diagnostics Block (DB) coupled to the Programming Block (PB) and the Distance Measuring Block (DMB).

* * * * *